United States Patent [19]

Savell

[11] 4,270,787
[45] Jun. 2, 1981

[54] DISPLACEABLE LAMP

[75] Inventor: Charles L. Savell, Birmingham, Mich.

[73] Assignee: Ford Motor Company, Dearborn, Mich.

[21] Appl. No.: 126,926

[22] Filed: Mar. 3, 1980

[51] Int. Cl.³ .............................................. B60R 19/08
[52] U.S. Cl. .................................... 293/121; 293/136; 362/82
[58] Field of Search ............... 293/120, 121, 132, 134, 293/135, 136, 137, 117; 362/82

[56] References Cited

U.S. PATENT DOCUMENTS

| 3,869,164 | 3/1975 | Schwenk | 293/120 |
| 3,869,165 | 3/1975 | Miller | 293/121 |
| 4,213,644 | 7/1980 | Scrivo | 293/136 |

Primary Examiner—Robert R. Song
Attorney, Agent, or Firm—John J. Roethel; Clifford L. Sadler

[57] ABSTRACT

In combination a vehicle bumper comprising a rigid support beam covered with a resilient elastomeric impact energy absorbing body and a lamp assembly housed within the bumper. The lamp assembly having a body and lens assembly telescopically mounted on housing supported within the beam and normally biased to telescopically project into the energy absorbing body. Upon impact causing the energy absorbing body to abut the lamp body and lens assembly, the latter is telescopically retracted relative to the housing against the resistance of the biasing force. After the deflecting load is released, the lamp body and lens are biased to their normal extended relationship to the housing.

4 Claims, 2 Drawing Figures

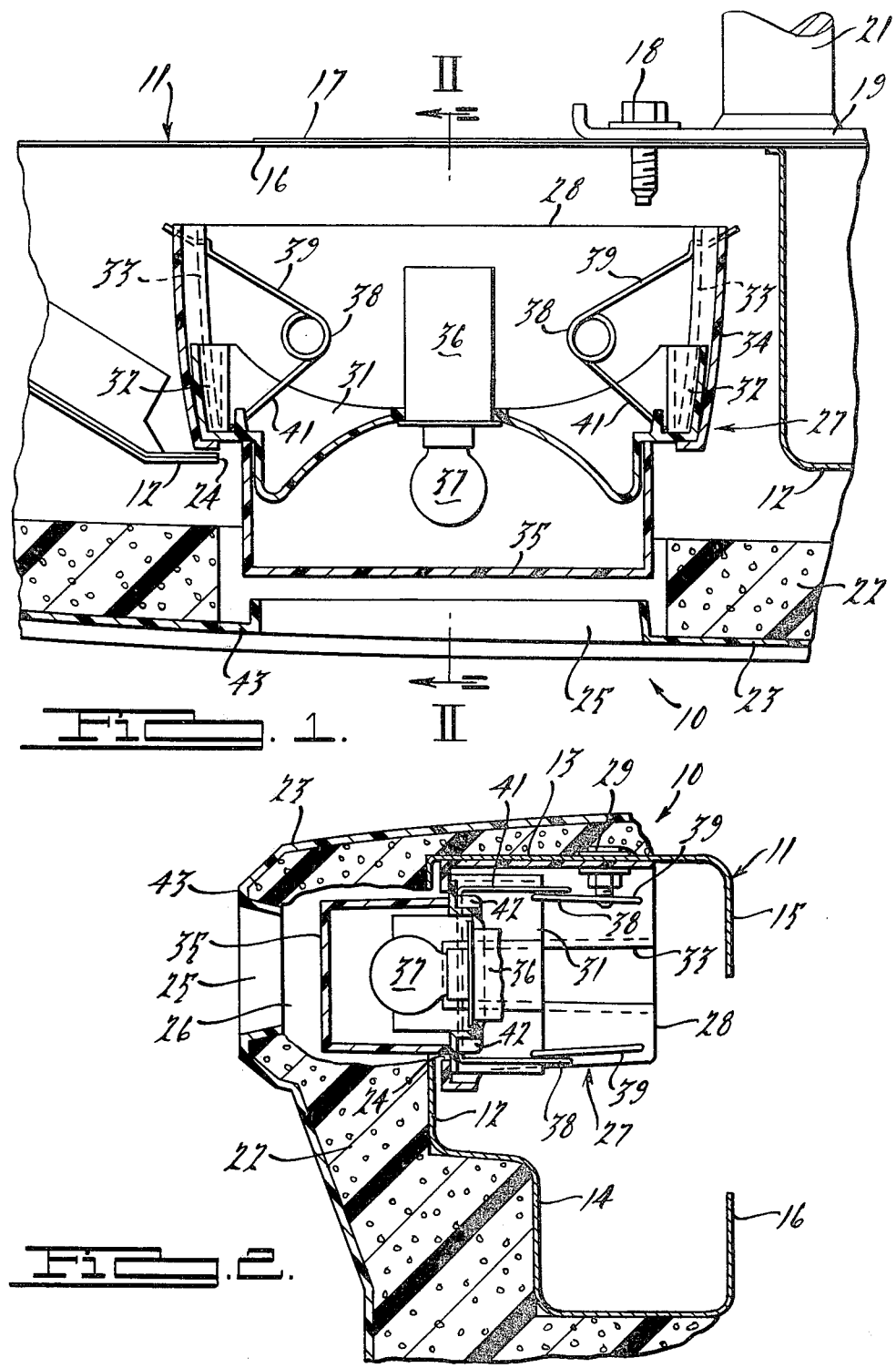

DISPLACEABLE LAMP

BACKGROUND OF THE INVENTION

The tend toward smaller and lighter automobiles has increased interest in bumper systems that comprise a rigid support beam covered with resiliently deformable elastomeric materials adapted to absorb the energy of impact. Regardless of the specific elastomeric material used in forming the energy absorbing cushion, the thickness of the bumper is substantially increased over the thickness of a conventional metal bumper. This increased thickness presents a problem if it is desired to mount the parking lamps, turn signal lamps or other lamps within the vertical confines of the bumper as disclosed in U.S. Pat. Nos. 3,706,468, issued Dec. 19, 1972 to S. J. Yoviene for a "Vehicle Bumper" and 4,070,051, issued Jan. 24, 1978 to D. Peter for a "Vehicle Bumper".

The Yoviene patent discloses a bumper beam having an aperture arranged to provide unobstructed view of the parking lamp mounted behind a bumper beam plate. The energy absorbing material also is provided with an aperture in alignment with the aperture of the support beam; but if the energy absorbing material is of substantial thickness, the visibility of the lamp from any direction other than one substantially normal to the plane of the lense would be minimal.

The present invention discloses a construction and arrangement of the bumper and lamp assembly that will maximize the visibility of the lamp.

SUMMARY OF THE INVENTION

The present invention relates to the combination of a vehicle bumer and a lamp assembly housed within the bumper. The vehicle bumper comprises a rigid support beam covered in the impact area with a resilient elastomeric impact energy absorbing body. The lamp assembly has a lamp body and lens assembly telescopically mounted on the housing supported within the beam. The housing is aligned with an opening extending through the energy absorbing body. The lamp body and lens assembly are biased in the direction to telescopically project from the housing into the energy absorbing body. The lamp body and lens assembly are telescopically retractible against the biasing force upon the bumper energy absorbing body being impacted in the area of the opening through which the lamp lens is visible and being restored to normal telescopic relationship by the biasing force upon release of the deflecting force.

DESCRIPTION OF THE DRAWINGS

Other objects, advantages and features of the present invention will become more apparent as the description proceeds, reference being had to the accompanying drawing, wherein:

FIG. 1 is a horizontal section view taken through a segment of the bumper and lamp assembly embodying the present invention; and FIG. 2 is a vertical section taken on the line 2—2 of FIG. 1.

DETAILED DESCRIPTION OF THE INVENTION

Referring now to the drawing, the vehicle bumper generally designated 10, comprises a rigid, box section, support beam 11 having a vertical impact face 12, a horizontal upper plate portion 13 and a lower stepped portion 14. The support beam 11 has inwardly turned flange portions 15 and 16 paralleling the impact face 12 to complete the box-like section. As seen in FIG. 1, the flanges 15 and 16 are reinforced by a vertical reinforcement plate 17 to which is bolted as at 18 the flange 19 on the end of a shock absorber-type support strut 21 extending from the vehicle frame (not shown).

The beam 11 is covered on the top of the plate portion 13, the outer side of the vertical impact face 12 and the outer side of the lower step portion 14 by a suitable elastomeric energy absorbing material, for example, a polyurethane foam 22 having an integral skin 23.

The configuration of the support beam 11 and the elastomeric covering material have no particular significance with respect to the bumper shown in the drawing other than the fact that the elastomeric material covering the impact face of the beam is of substantial thickness. This presents a problem if it is desired to mount a parking or turn signal lamp assembly within the bumper. Conventional practice is to mount the lamp assembly behind the vertical impact surface of the beam, a suitable opening being provided in the impact face through which the lens of the lamp assembly is visible. As shown in the referenced Pat. No. 3,706,468, it then is necessary to provide an opening or aperture in the elastomeric material through which the light from the lamp can shine. With an elastomeric material of substantial thickness as seen in FIG. 2, the lamp will only be visible from a position almost directly normal to the plane of the lens.

In a turn signal application of a bumper mounted lamp assembly, it is desirable that the turn signal lamp be visible, especially in a front bumper application, from an angle so that a vehicle entering an intersection from the left or the right of the signaling vehicle can have some forewarning of the intention to make a turn. It is, therefore, also desirable that the front face of the lens of the lamp assembly be as close as possible to the front face of the impact surface of the energy absorbing material.

As seen in the drawing, the vertical impact face 12 of the support beam is provided with an aperture 24. The energy absorbing material 22-23 is likewise provided with an aperture 25 that opens into a pocket 26 that is aligned with the aperture 24 in the impact face 12.

The lamp assembly, generally designated 27, to be mounted within the bumper 10 comprises a substantially tubular housing 28 of rectangular cross section. The housing is bolted at 29 or otherwise secured to the underside of the plate 13 of the beam 11. The housing 28 is axially aligned with the apertures 24 and 25. A lamp body 31 is mounted within the housing 28 for sliding telescopic movement relative to the latter. The lamp body has side members 32 slidable in guide grooves 33 in the side walls 34 of the housing 28. A lens 35 having a substantially planar lens face is bonded to the lamp body 31 to complete the enclosure for the lamp socket 36 and bulb 37. At each side of the housing 28 a sear spring 38 is provided, one leg 39 of each sear spring being anchored to a side wall of a housing and the other leg 39 being interlocked with a retention tab 42 on the lamp body 31. The sear springs 38 are preloaded to maintain the lamp body 31 in an extended or telescoped relation to the housing 28 so that the lens 35 projects a substantial distance beyond the impact face 12 of the beam 11 into the pocket 26 in the energy absorbing material to minimize the distance between the lens face and the impact face 43 of the energy absorbing material.

The foregoing thus provides a construction and arrangement in which an impact upon the energy absorbing body 22-23 in the vicinity of the lamp opening forces the latter into engagement with the lamp body 31 and lens 35 and causes the latter to be retracted into the housing 28 against the resistance of the sear spring 38. After the deflecting load is released, the sear spring 38 is then effective to restore the lamp body and lens 35 to normal extended relationship to the housing 28.

It is to be understood this invention is not limited to the exact construction illustrated and described above, but that various changes and modifications may be made without departing from the spirit and scope of the invention as defined in the appended claims.

I claim:

1. In combination, a vehicle bumper comprising a hollow rigid support beam having a resiliently deformable impact energy absorbing body extending over the impact face of the beam;

the impact face of the beam and the energy absorbing body covering the same having axially aligned openings therethrough;

and a lamp assembly mounted within the bumper;

the lamp assembly comprising a housing secured to the beam interiorly of the latter in axial alignment with the opening therein;

a lamp body;

the housing and lamp body being telescopically slidable relative to one another;

a lens mounted on the lamp body;

and a biasing means between the housing and the lamp body normally maintaining the two telescopically extended;

the lamp body and lens when in telescopically extended relation to the housing projecting through the impact face of the support beam into the opening in the energy absorbing body;

the energy absorbing body upon impact deflection toward the support beam in the area of the lamp body causing the lamp body and lens to retract into the housing against resistance of the biasing means;

the biasing means being operative to restore the lamp body and lens to extended relationship to the housing after the deflecting load has been removed.

2. In combination, according to claim 1, in which:

the lamp assembly housing is of substantially rectangular tubular cross section;

and the lamp body is of substantially complementary cross-sectional shape and slidable within the housing.

3. In combination, a vehicle bumper comprising a rigid box support beam substantially concealed within a resiliently deformable elastomeric impact energy absorbing body;

an axial opening extending from a vertical impact face of the energy absorbing body concealing the support beam;

the lamp assembly mounted within the bumper;

the lamp assembly comprising a substantially tubular housing fixedly mounted within the support beam in axial alignment with the opening in the bumper energy absorbing body;

a lamp body telescopically slidable in the housing;

a lens mounted on the lamp body;

and spring means between the housing and the lamp body normally maintaining the two telescopically extended;

the lamp body and lens when in telescopically extended relation to the housing projecting from within the support beam into the energy absorbing opening;

the energy absorbing body upon impact deflection into engagement with the lamp body and lens causing the latter to retract into the housing against the resistance of the biasing means;

the biasing means after the deflecting load is released being effective to restore the lamp body and lens to a normal extended relationship to the housing.

4. In combination, according to claim 3, in which:

the lamp assembly tubular housing is of substantially rectangular cross section;

and the lamp body is of substantially complementary cross-sectional shape and slidable within the housing.

* * * * *